United States Patent
Rhee et al.

(10) Patent No.: US 8,585,939 B2
(45) Date of Patent: Nov. 19, 2013

(54) METHOD FOR PREPARING SINTERED ANNULAR NUCLEAR FUEL PELLET

(75) Inventors: Young-Woo Rhee, Daejeon (KR);
Dong-Joo Kim, Daejeon (KR);
Kun-Woo Song, Daejeon (KR);
Jong-Hun Kim, Daejeon (KR);
Keon-Sik Kim, Daejeon (KR); Jae-Ho Yang, Daejeon (KR); Ki-Won Kang, Daejeon (KR); Chill-Sun Ryu, legal representative, Daejeon (KR)

(73) Assignees: Korea Atomic Energy Research Institute, Daejeon (KR); Korea Hydro & Nuclear Power Co., Ltd., Seoul (KR)

(*) Notice: Subject to any disclaimer, the term of this patent is extended or adjusted under 35 U.S.C. 154(b) by 457 days.

(21) Appl. No.: 12/871,146

(22) Filed: Aug. 30, 2010

(65) Prior Publication Data
US 2011/0049734 A1     Mar. 3, 2011

(30) Foreign Application Priority Data
Sep. 3, 2009 (KR) .......................... 10-2009-0083123

(51) Int. Cl.
G21C 21/00 (2006.01)
B28B 21/00 (2006.01)
B28B 3/00 (2006.01)
C04B 33/32 (2006.01)

(52) U.S. Cl.
USPC .............................. 264/0.5; 264/632; 264/662

(58) Field of Classification Search
USPC ........................................................ 264/0.5
See application file for complete search history.

(56) References Cited

U.S. PATENT DOCUMENTS

| 3,504,058 | A | * | 3/1970 | Masselot | 264/0.5 |
| 3,928,132 | A | | 12/1975 | Bujas | |
| 4,014,968 | A | * | 3/1977 | Simon | 264/630 |
| 4,774,051 | A | * | 9/1988 | Peehs et al. | 264/0.5 |
| 4,869,868 | A | | 9/1989 | Lay et al. | |
| 2005/0261136 | A1 | | 11/2005 | Rhee et al. | |

FOREIGN PATENT DOCUMENTS

| JP | 05045484 A | 2/1993 |
| JP | 05072384 A | 3/1993 |
| JP | 07055975 A | 3/1995 |
| JP | 7074833 B2 | 8/1995 |

(Continued)

OTHER PUBLICATIONS

JP 02-588947 B2 (Tokai et al.) Dec. 3, 1997 (English language machine translation of document cited on IDS dated Feb. 15, 2011). [online] [retrieved Feb. 7, 2013]. Retrieved from: Advanced Industrial Property Network Japan Patent Office.*

(Continued)

Primary Examiner — Joseph S Del Sole
Assistant Examiner — Erin Snelting
(74) Attorney, Agent, or Firm — The Webb Law Firm (57) ABSTRACT

A method for fabricating a sintered annular nuclear fuel pellet includes molding nuclear fuel powder or granule, an oxide of a fissile element (M), to fabricate an annular nuclear fuel green body. A rod-like shaped structure is inserted into the annular nuclear fuel green body and sintered in a slight oxidizing gas atmosphere such that the oxide of the fissile element has a balanced O/M ratio higher than a desired O/M ratio (oxygen/fissile element) of a final sintered annular nuclear fuel pellet, while being maintained in a cubic phase. The sintered annular nuclear fuel pellet is then reduced in a reductive gas atmosphere so as to have the desired O/M ratio in the state that the rod-like shaped structure is inserted.

14 Claims, 4 Drawing Sheets

(56) References Cited

FOREIGN PATENT DOCUMENTS

| | | |
|---|---|---|
| JP | 2588947 B2 | 3/1997 |
| JP | 11202073 A | 7/1999 |
| KR | 19970003283 A | 1/1997 |
| KR | 20050110757 A | 11/2005 |
| WO | 9701174 A1 | 1/1997 |

OTHER PUBLICATIONS

Bae, Ki-Kwang et al., "Characterization and comparison of the sintering behaviors of the variously-treated UO2 powders", Annual International Conference—Canadian Nuclear Association (1992), one page.

Saidy, Madiba et al., "Thermal diffusion of iodine in UO2 and UO2+x", Journal of Nuclear Materials, vol. 372 (2008), pp. 405-415.

Rhee, Young Woo et al., "Diametric Tolerance Control of Dual Cooled Annular Fuel Pellet without Inner Surface Grinding", Proceedings of Top Fuel 2009, Paris, France, Paper 2075, Sep. 6-10, 2009, pp. 1222-1225.

Rhee, Young Woo et al., "Effect of Granule Size on Diametric Tolerance of Annular Fuel Pellet", Transactions of the Korean Nuclear Society Spring Meetying, Gyeongiu, Korea (May 29-30, 2008), 2 pages.

Somayajulu, P.S. et al., "Development of annular pellet production techniques for PFBR fuel", International Conference on Advances in Powder Materials Processing in Nuclear, Space, Defence and Industrial Sectors, Hyderabad, India (Mar. 23-25, 1999), 2 pages.

German, Randall M., "Green body homogeneity effects on sintered tolerances", Powder Metallurgy (2004, vol. 47, No. 2, pp. 157-160.

Minakawa, Susumu et al., "Report of annular pellet fabrication technology development. Outlines of development program and interim result" (Jun. 2000), No. 7, 1 page (Abstract only).

* cited by examiner

PRIOR ART

METHOD FOR PREPARING SINTERED ANNULAR NUCLEAR FUEL PELLET

CROSS-REFERENCE TO RELATED APPLICATIONS

This application claims the priority of Korean Patent Application No. 10-2009-0083123 filed on Sep. 3, 2009, in the Korean Intellectual Property Office, the disclosure of which is incorporated herein by reference.

BACKGROUND OF THE INVENTION

1. Field of the Invention

The present invention relates to a sintered annular nuclear fuel pellet and, more particularly, to a method for fabricating a sintered annular nuclear fuel pellet without performing an inner side grinding processing so that the sintered annular nuclear fuel pellet can be used for a dual-cooling nuclear fuel rod that heat transfer simultaneously occurs at the inner and the outer claddings.

2. Description of the Related Art

In general, a uranium dioxide ($UO_2$) pellet is the most commonly used nuclear fuel of a commercial reactor. A $UO_2$ pellet contains a certain amount (e.g., 1 wt % to 5 wt %) of $U^{235}$ and, while it is in use in a nuclear reactor, $U^{235}$ of the $UO_2$ pellet reacts with a neutron, generating nuclear fission energy. The pellet (i.e., the sintered pellet) of a light-water reactor nuclear fuel has a cylindrical shape (e.g., having a diameter of about 8 mm and a length of about 10 mm). The centers of the upper and lower surfaces of the cylinder are dished up and corners of the upper and lower surfaces are chamfered to have a flat chamfer.

In general, the sintered nuclear fuel pellet is used in cylindrical rod form in such a manner that it is charged in a zirconium alloy cladding tube having a certain length (e.g., about 4 m) in the commercial nuclear reactor. Such a commercial nuclear fuel rod is limited in its performance in terms of temperature and heat flux.

The $UO_2$ pellet (i.e., the sintered pellet) has many advantages as a nuclear fuel, but its thermal conductivity is low, compared with a metal or nitride nuclear fuel, failing to quickly transfer heat generated according to nuclear fission to cooling water, and the pellet therefore has a much higher temperature than that of the cooling water during operations. For example, the cooling water has a temperature ranging from 320 degrees Celsius to 340 degrees Celsius, and the pellet has the highest temperature at its center and the lowest temperature at its surface. The temperature at the center of a pellet of a normally burned nuclear fuel rod ranges from 1,000 degrees Celsius to 1,500 degrees Celsius.

The pellet remaining at a high temperature results in an encroachment of a margin for safety in the occurrence of various design basis nuclear reactor accidents. For example, in the occurrence of a loss of coolant accident, the safety margin becomes smaller, as the temperature of the nuclear fuel immediately before the accident is high. Also, when the heat flux of the nuclear fuel rod increases, a departure of nucleate boiling may occur. The occurrence of the departure of nucleate boiling leads to a formation of an air bubble curtain on the surface of the cladding tube, severely degrading a heat transmission to potentially damage the nuclear fuel rod.

Figure 1:
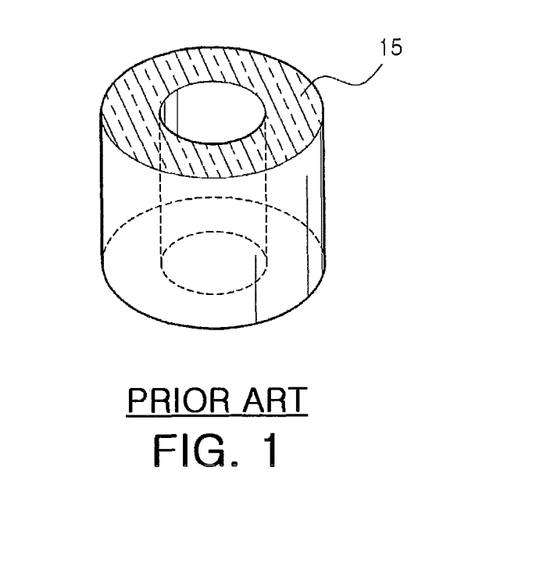
FIG. 1 is a schematic perspective view showing a general sintered annular nuclear fuel pellet.
Figure 2:
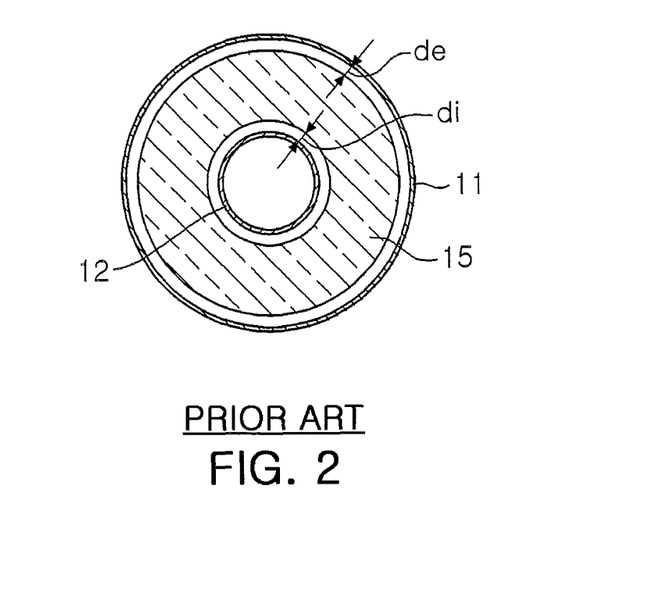
FIG. 2 is a sectional view of a dual-cooling annular nuclear fuel rod employing the sintered annular nuclear fuel pellet illustrated in FIG. 1.

In an effort to solve the problem, an annular nuclear fuel rod (U.S. Pat. No. 3,928,132 entitled 'Annular fuel element for high temperature reactor' by Roko Bujas in 1975) was proposed, which includes an outer cladding tube 11, an inner cladding tube 12 coaxially disposed with the outer cladding tube 11 and having a diameter smaller than that of the outer cladding tube 11, and an annular pellet 15 charged between the outer cladding tube 11 and the inner cladding tube 12 as illustrated in FIG. 1 and FIG. 2.

The related art annular nuclear fuel rod 10 allows a coolant to additionally flow along the center having the highest temperature in the cylindrical commercial nuclear fuel rod, so the average temperature of the nuclear fuel rod can be significantly reduced. In addition, because the heat transfer area per nuclear fuel rod is drastically increased to reduce heat flux, so the thermal margin can be improved.

However, heat generated from the annular pellet of the related art annular nuclear fuel rod is transferred to the coolant through the both sides of the inner cladding tube and the outer cladding tube, so if a large amount of heat is transferred to one side, heat transferred to the other side is reduced by as much. The amount of generated heat transferred via either of the inner and outer cladding tubes has a connection with the thermal resistance of both directions, so a larger amount of heat is distributed to the cladding tube having a smaller thermal resistance, causing a problem in that the heat flux of one cladding tube becomes higher than that of the other cladding tube.

About a half of the thermal resistance present in the annular nuclear fuel rod is taken up by the thermal resistance of gaps existing between the pellet and the inner and outer cladding tubes, and in this case, the thermal resistance of the gap is proportional to the size of the gap.

In order to reduce the thermal resistance of the gaps de and di between the annular pellet 15 and the cladding tubes 11 and 12 after fabrication, the gaps are set to be as small as possible within a fabrication range (e.g., 50 μm to 100 μm). Recently, a reduction of the internal gap to below 30 μm has been proposed as a solution to the asymmetry of the heat flux.

Thus, in order to obtain a desired gap size, accurate adjusting of the dimensions of the inner and outer diameters of the annular pellet and precise controlling of the dimension tolerance are crucial in terms of the fabrication of the annular pellet.

In the process of manufacturing the commercial nuclear fuel pellet, a nuclear fuel powder or granule is charged in a mold and then pressed by pressing a vertical molding punch through double acting uniaxial pressing to fabricate a green compact (or a green body), and then, the green body is sintered. The green body fabricated through the double acting uniaxial pressing is sintered to be deformed such that the diameter of a central portion of the green body is smaller than the diameters of the upper and lower portions of the green body, for example, in a shape such as a double-headed drum with a narrow waist in the middle or an hourglass. Thus, the green body undergoes a centerless grinding process in order to have a uniform diameter along length of the pellet.

Compacting process variables affecting the dimension and shape of the sintered pellet include a variation in a green density among various green bodies due to the difference in the amount of powder introduced into the mold during an auto-molding process, a non-uniform green density distribution in a single green body caused by frictional contact on the wall of the molding frame, and the like.

First, as for the variation of the dimension of a pellet due to the difference in green densities among various green bodies, R. M. German (Powder Metallurgy 2004, Vol. 47, No. 2 pp 157-160) revealed that, provided the pressing conditions and sintering conditions are the same, when the dimension of a green body is the same, a green density can be represented by the weight of the green body and there is such a relationship as expressed by Equation (1) shown below between variations of the weight of the green body and the dimension of the sintered pellet.

$$\frac{\text{green mass variation}}{\text{mean mass}} \leq 3 \frac{\text{tolerance}}{\text{mean size}} \qquad \text{[Equation (1)]}$$

Namely, it means that, in order to obtain a dimension tolerance of ±0.2 percent between sintered bodies, the variation of the weight of the green body needs to be adjusted to be ±0.6 percent or smaller. However, because there is the potential for another process variable influence in an actual process, the variation of the weight of the green body needs to be controlled more minutely. For example, in the above-mentioned document, the variation of the weight of the green body is adjusted to be 0.2 percent or smaller in the uniaxial pressing process to maintain the dimension tolerance of the sintered body within the range from ±0.14 percent to ±0.20 percent.

Next, the non-uniformity of the green density in a single green body causes a sintering deformation in the shape of a double-headed drum with a narrow waist in the middle or an hourglass. The difference in the green density in the green body causes a difference in the sintering shrinkage of each part of the green body during sintering, triggering deformation and even cracking in a worst case scenario.

Figure 3:
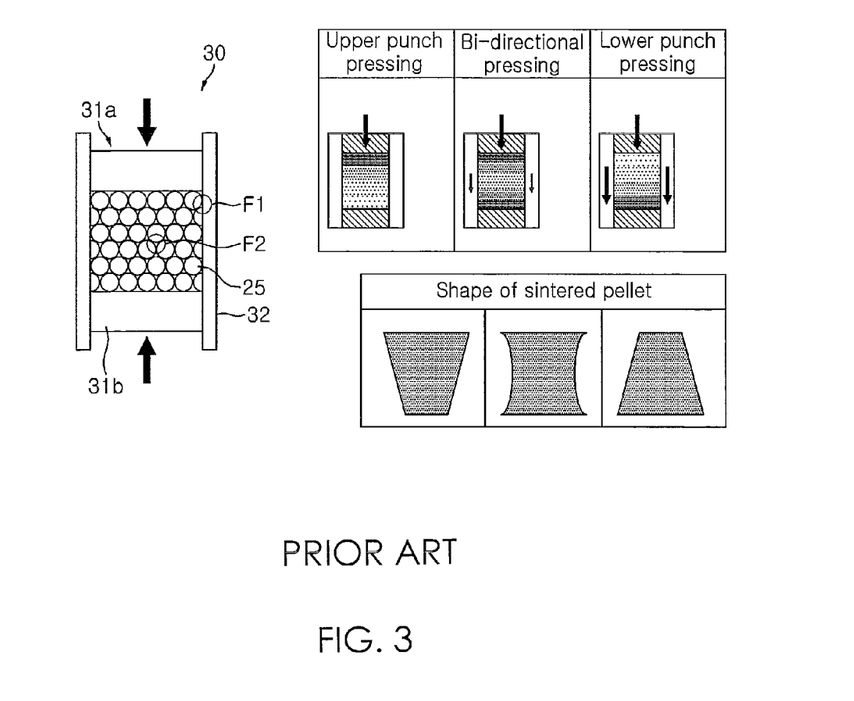
FIG. 3 is a schematic view showing a green density distribution within a green body and the shape of a sintered pellet (pellet) according to a pressing direction.

FIG. 3 is a schematic view showing a green density distribution within the green body and the shape of a sintered pellet (pellet) according to a pressing direction.

With reference to FIG. 3, a molding device 30 includes a molding frame 32 and an upper punch 31a and a lower punch 31b disposed at upper and lower portions of the molding frame 32. A non-uniform density distribution caused by pressing results from a friction (F1) between powder 25 and the molding frame 32 and a friction (F2) between powder grains 25.

The pressure applied to the surface of the powder 25 filling the molding frame 32 by the pressing punches 31a and 31b is lost due to friction. Thus, in the powder away from the punched surface, the actual working force is reduced compared to the applied pressure. The less-compressed area has a lower green density than that of an area to which a higher pressure is applied. The low-density area is incompletely densified or greatly shrunken compared with other neighboring areas.

A cylindrical-type sintered pellet can obtain precise dimension tolerance with a certain outer diameter through centerless grinding, but in the case of a sintered annular pellet, both the outer surface and inner surface would be deformed, so both inner and outer diameters would require grinding. General centerless grinding can resolve only the tolerance of an outer diameter and an outer diameter dimension.

In order to adjust the tolerance with an inner diameter dimension, the inner side of the sintered pellet needs to be ground. For the inner side grinding, precise grinding using a diamond wheel or sandblasting process may be performed. In this respect, however, because the inner diameter distribution of the sintered annular pellet is different for each sintered pellet, in case of the diamond wheel grinding, the sintered annular pellets must be held one by one and ground, unlike centerless grinding, resulting in degradation of productivity.

In general, inferior or defective products or grinding residues or remnants, namely, those containing high-priced enriched uranium generated from the nuclear fuel fabrication process, are powdered through an oxidation process or the like so as to be recycled. However, in case of sandblasting, uranium and sand are mixed with the grinding residues, making it difficult to recycle the costly uranium content. Thus, a problem arises in separating the uranium from the grinding residues and controlling the impurity contents.

SUMMARY OF THE INVENTION

An aspect of the present invention provides a method for fabricating a sintered annular nuclear fuel pellet capable of maintaining a uniform value of an inner diameter of a sintered annular nuclear fuel pellet and maintaining a low level (±13 µm, a current specification of a dimension tolerance of a commercial nuclear fuel pellet, or lower) of inner diameter tolerance with respect to the length (in the direction of a central axis) of the pellet, without performing a disadvantageous grinding process.

According to an aspect of the present invention, there is provided a method for fabricating a sintered annular nuclear fuel pellet, including: pressing nuclear fuel powder or granule, an oxide of a fissile element (M), to fabricate an annular nuclear fuel green body; inserting a rod-like shaped structure into the annular nuclear fuel green body; sintering the rod-like shaped structure-inserted annular nuclear fuel green body in the slight oxidizing gas atmosphere such that the oxide of the fissile element has a balanced O/M ratio (oxygen/fissile element) higher than a desired O/M ratio of a final sintered annular nuclear fuel pellet, while being maintained in a cubic phase; reducing the sintered annular nuclear fuel pellet in a reductive gas atmosphere so as to have the desired O/M ratio in the state that the rod-like shaped structure is inserted; and separating the rod-like shaped structure from the reduced sintered annular nuclear fuel pellet.

Typically, the oxide of the fissile element may be uranium oxide. In this case, the desired O/M ratio and the balanced O/M ratio may be a desired O/U (oxygen/uranium) ratio and a balanced O/U, respectively.

When the current requirement of specifications of a sintered nuclear fuel pellet is considered, a desired O/U ratio of the sintered annular nuclear fuel pellet may range from 2.00 to 2.02.

Preferably, the balanced O/U ratio of the nuclear fuel green body sintered in the slight oxidizing gas atmosphere may range from 2.1 to 2.25.

In a particular exemplary embodiment, the rod-like shaped structure may be made of a metal material having a dimensional stability maintained in the sintering process and the reducing process. For example, the rod-like shaped structure may be made of an INCONEL®-based alloy.

In a different particular exemplary embodiment, the rod-like shaped structure may be made of a ceramic material having a dimensional stability maintained in the sintering process and the reducing process. For example, the rod-like shaped structure may include at least one ceramic material selected from the group consisting of $ZrO_2$, $ThO_2$, MgO, $Al_2O_3$, SiC, $Si_3N_4$, and graphite.

In order to obtain an effect of restraining a non-uniform sintering deformation in the sintered pellet, the diameter of the rod-like shaped structure is the same as or larger than the largest inner diameter of the sintered annular nuclear fuel pellet in a state that the rod-like shaped structure is not inserted.

The slight oxidizing gas may be at least one selected from the group consisting of carbon dioxide, water vapor, and inert gas, or may be a gas obtained by mixing a gas of the group and a hydrogen gas.

Preferably, only a hydrogen gas is used as the reductive gas in the reducing process in terms of a reducing speed.

Preferably, the sintering of the annular nuclear fuel green body may be performed at a temperature ranging from 1,000 degrees Celsius to 1,500 degrees Celsius. The reducing of the sintered annular nuclear fuel pellet may be performed at a temperature ranging from 500 degrees Celsius to 1,500 degrees Celsius. The nuclear fuel powder or granule may be a ceramic material containing one or more fissile elements (M) selected from the group consisting of uranium, plutonium, and thorium.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

The present invention proposes a method for fabricating a sintered annular nuclear fuel pellet having a inner diameter of a uniform size and a small inner diameter tolerance by employing a method of sintering a rod-like shaped structure having a precisely machined outer diameter dimension in a state of being insertedly positioned within an annular green body.

An outer diameter of the rod-like shaped structure may have a dimension corresponding to an inner diameter required by specifications of a sintered annular nuclear fuel pellet, and may need to have a dimensional stability maintained under annular nuclear fuel sintering conditions and reducing conditions. The rod-like shaped structure serves to restrain an annular green body from being additionally contracted (shrunken) in its inner diameter at a point in time when the annular green body is brought into contact with the rod-like shaped structure while being contracted during sintering, to thereby uniformly maintain the inner diameter of the sintered annular pellet.

Also, the rod-like shaped structure serves to correct the difference in green density between annular molded bodies or the difference in a sintering shrinkage resulting from a fine change in sintering conditions and restrain a non-uniform sintering deformation according to a green density distribution in a single green body.

The exemplary embodiments of the present invention will now be described in detail with reference to the accompanying drawings.

Figure 4A:
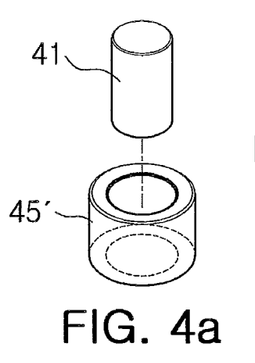
FIGS. 4(a) to 4(c) are a schematic perspective view showing states of an annular nuclear fuel in each process for explaining a method for fabricating a sintered annular pellet according to an exemplary embodiment of the present invention.
Figure 4B:
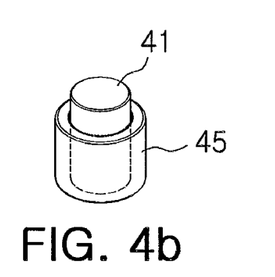
Figure 4C:
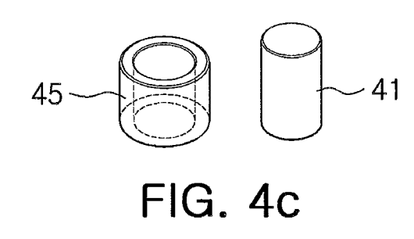

FIGS. 4(a) to 4(c) are a schematic perspective view showing states of an annular nuclear fuel in each process for explaining a method for fabricating a sintered annular pellet according to an exemplary embodiment of the present invention.

First, as shown in FIG. 4(a), a rod-like shaped structure 41 is inserted into an annular green body 45' fabricated by pressing a nuclear fuel granule.

When the annular green body 45' having the rod-like shaped structure 41 inserted therein is heated, the annular green body 45' is sintered so its outer diameter and inner diameter are contracted in length as the temperature goes up. Here, although different according to the green density distribution in the green body 45', when the double acting uniaxial pressing is performed, a green density at a middle portion of the green body 45' is lower than that of both end portions of the green body 45', so the rod-like shaped structure 41 is first contacted.

The contacted portion is not contracted in the sintering any longer, maintaining a uniform inner diameter. As the sintering proceeds, other portions are contracted, so the inner diameters of other portions are reduced until such time as the rod-like shaped structure 41 is entirely in contact with the inner surface.

Preferably, the rod-like shaped structure 41 that can be employed in the present exemplary embodiment is made of a material having a high strength at a sintering temperature not allowing for a considerable dimension variation over a thermal change and sintering pressure required in the processes (e.g., the sintering process and the reducing process). In one exemplary embodiment, the rod-like shaped structure may be made of a metal material. For example, the rod-like shaped structure 41 may be made of an INCONEL®-based alloy.

In a different exemplary embodiment, the rod-like shaped structure 41 may be made of a ceramic material. For example, the rod-like shaped structure 41 may be made of at least one ceramic material selected from the group consisting of $ZrO_2$, $ThO_2$, $MgO$, $Al_2O_3$, $SiC$, $Si_3N_4$, and graphite.

FIG. 4b shows a sintered annular pellet 45 in a state wherein the inner side surface is entirely in contact with the rod-like shaped structure 41 after the sintering is completed.

With the sintering completed, the outer circumferential surface of the inserted rod-like shaped structure 41 and the inner side surface of the sintered annular pellet 45 are substantially in contact with each other (in actuality, however, there may be a fine gap therebetween). In the present exemplary embodiment, the annular nuclear fuel green body is sintered under the condition that the slight oxidizing gas atmosphere has a balanced O/U (oxygen/uranium) ratio higher than a desired O/U of a final sintered annular pellet 45. The sintering process may be performed at a temperature ranging from 1,000 degrees Celsius to 1,500 degrees Celsius.

Unless otherwise specified, the term 'slight oxidizing gas atmosphere' used in the present invention may refer to an atmosphere of such a slight oxidizing gas as to be maintained on a cubic uranium oxide. The slight oxidizing gas may be at least one selected from the group consisting of carbon dioxide, water vapor, and inert gas, or may be a gas obtained by mixing a gas of the group and a hydrogen gas.

The annular nuclear fuel pellet 45, sintered in the slight oxidizing gas atmosphere, is reduced in the reductive gas atmosphere and adjusted to have a desired O/U ratio, and in this process, a lattice constant increases, so the volume of the sintered pellet 45 expands. Finally, a desired O/U ratio of the final sintered annular nuclear fuel pellet 45 obtained in the final reductive gas atmosphere may range from 2.00 to 2.02.

In consideration of the O/U ratio of the final sintered pellet 45, preferably, the slight oxidizing gas atmosphere employed for the sintering process of the present invention may be a condition under which the balanced O/U ratio of the annular nuclear fuel green body 45' can be maintained within a range of 2.1 to 2.25. Under this condition, an appropriate volume expansion of the final sintered pellet 45 can be anticipated through a variation of the lattice constant in the process of obtaining the final sintered pellet 45 while maintaining the cubic uranium oxide.

The variation of the lattice constant over the O/U ratio of the cubic uranium oxide sintered pellet as described above may be represented by Equation (2) shown below (J. Belle, Uranium Dioxide: Properties and Nuclear Application, USAEC, 1961, p. 174):

$$a_x = 5.4690 - 0.12x \quad \text{[Equation (2)]}$$

Here, $a_x$ axis a lattice constant when the O/U ratio is 2+x, and the unit is Å.

As for the resultant volume expansion of the rod-like shaped structure, because only the volume of the sintered annular pellet expands without any additional change or artificial manipulation during the reducing process, a gap can be formed between the rod-like shaped structure and the sintered annular pellet, thus providing an advantage of easily realizing the separation of the rod-like shaped structure and the sintered annular pellet. Also, when the final sintered annular pellet is separated from the rod-like shaped structure, the sintered annular nuclear fuel pellet having a uniform inner diameter distribution can be obtained by virtue of the rod-like shaped structure as shown in FIG. 4c.

Preferably, only a hydrogen gas is used as the reductive gas in the reducing process in terms of a reducing speed. The reducing process may be performed at a temperature ranging from 500 degrees Celsius to 1,500 degrees Celsius.

Also, the nuclear fuel powder or granule may be a ceramic material containing one or more fissile elements selected from the group consisting of uranium, plutonium and thorium.

When the diameter of the rod-like shaped structure is equal to or larger than the largest diameter of the sintered annular nuclear fuel pellet to be finally obtained, the inner diameter tolerance can be effectively controlled by using the rod-like shaped structure to thereby restrain non-uniform sintering deformation in the sintered pellet. In this case, the effect of easily separating the sintered annular body from the rod-like shaped structure can be more advantageously attained.

As a result, each of final sintered annular nuclear fuel pellets has a uniform inner diameter and the inner diameter distribution over the lengthwise direction of the sintered pellet is narrow and a dimensional tolerance is small, the inner diameter dimensional tolerance can be improved to be below 13 μm without performing a grinding process on the inner surface of the sintered pellets. Thus, the inner and outer gap of the annular nuclear fuel rods can be precisely adjusted through the sole use of the general outer diameter centerless grinding process, and in addition, the imbalance of heat flux of the annular nuclear fuel rod can be solved.

In the exemplary embodiment as described above, uranium oxide ($UO_2$) is taken as an example, but the present invention is not limited thereto and a sintered nuclear fuel pellet in which a portion of, or the entirety of, $UO_2$ is substituted by plutonium dioxide ($PuO_2$), thorium dioxide ($ThO_2$), and the like, having the same lattice structure as that of $UO_2$ can be also applicable to a nuclear fuel to which the fabrication process and the sintering deformation aspect are similarly applied.

Namely, a sintered annular nuclear fuel pellet having plutonium, thorium, and the like, the other fissile elements which substitute for uranium, can be advantageously applied according to the method for fabricating a sintered annular nuclear fuel pellet.

In the above description, it could be understood that the term 'O/U ratio' may be replaced by 'O/M ratio' when an arbitrary fissile element is expressed as M, which can be generalized for a method for fabricating a sintered annular nuclear fuel pellet including a different fissile element.

The object, a technical configuration and an operational effect of the present invention will now be described in detail by using an exemplary embodiment of the present invention.

Embodiment

IDR-$UO_2$ powder was pre-compacted under 0.1 ton/cm². Pre-compacted lump of $UO_2$ powder was crushed and allowed to pass through a 50-mesh sieve to fabricate granules. 0.3 wt % of zinc state was added as a lubricant to the fabricated granules, which were then mixed in a tubular mixer for 30 minutes.

The thusly mixed granules were charged (i.e., loaded) in a double acting uniaxial press and pressed with a pressure of about 4 ton/cm² to fabricate an annular green body. The inner and outer diameters of the annular green body were measured at every interval of 1 mm along the length of the green body by using a contact type three-dimensional measurement machine. The density of the annular green body was an about 54 percent of the theoretical density.

The annular green body with an yttria-stabilized $ZrO_2$ rod having an outer diameter of 10.156 mm inserted therein was sintered in a carbon dioxide atmosphere for four hours at a temperature of 1,250 degrees Celsius, and then reduced for two hours at a temperature of 900 degrees Celsius in a hydrogen atmosphere. The O/U ratio of the sintered annular body (or pellet) in the sintering process was 2.19, and after the reducing process, the O/U ratio of the sintered annular body was 2.001. The density of the sintered annular body was measured by using Archimedes' method, and the inner and outer diameters of the sintered annular body were measured at every interval of 1 mm along the length of the sintered body by using a contact type three-dimensional measurement machine. The tolerances of the inner and outer diameters, after sintering the sintered annular body and after reducing the sintered annular body, are shown in Table 1 below.

As noted in Table 1, an inner diameter dimension tolerance according to the method for fabricating a sintered annular pellet is ±4 or 7 μm, so the sintered annular body having an inner diameter dimension tolerance ±13 μm or smaller as in the specifications of a commercial sintered nuclear fuel pellet can be fabricated without performing a grinding process. It is also noted that the inner diameters of sintered bodies are uniformly maintained according to the results obtained by repeatedly fabricating first and second sintered bodies, and the like.

TABLE 1

|  | Inner diameter (mm) | | Outer diameter (mm) | |
| --- | --- | --- | --- | --- |
|  | Average | Tolerance | Average | Tolerance |
| First sintered body | 10.167 | 0.003 | 14.751 | 0.020 |
| Second sintered body | 10.170 | 0.006 | 14.757 | 0.022 |
| First sintered body after reduction | 10.185 | 0.004 | 14.781 | 0.021 |
| Second sintered body after reduction | 10.184 | 0.007 | 14.782 | 0.023 |

Comparative Example

IDR-$UO_2$ powder was pre-compacted under 0.1 ton/cm$^2$. Pre-compacted lump of $UO_2$ powder was crushed and allowed to pass through a 50-mesh sieve to fabricate granules. 0.3 wt % of zinc state was added as a lubricant to the fabricated granules, which was then mixed in a tubular mixer for 30 minutes.

The thusly mixed granules were charged (i.e., loaded) in a double acting uniaxial press and pressed with a pressure of about 4 ton/cm$^2$ to fabricate an annular green body. The inner and outer diameters of the annular green body were measured at every interval of 1 mm along the height of the green body by using a contact type three-dimensional measurement machine to obtain a dimensional tolerance. The annular green body without a rod-like shaped structure was sintered in a carbon dioxide atmosphere for four hours at a temperature of 1,250 degrees Celsius, and then reduced for two hours at a temperature of 900 degrees Celsius in a hydrogen atmosphere. The O/U ratio of the sintered annular body (or pellet) in the sintering process was 2.19, and after the reducing process, the O/U ratio of the sintered annular body was 2.001.

The density of the sintered annular body was measured by using Archimedes' method, and inner and outer diameters of the sintered annular body were obtained by using a contact type three-dimensional measurement machine. Tolerances of the inner and outer diameters after sintering the sintered annular body and after reducing the sintered annular body are shown in Table 2 below.

As noted in Table 2, the inner diameter dimension tolerance of the sintered annular body according to the related art method for fabricating a sintered annular body is ±16 µm, larger than that of the sintered annular body according to the present invention. It can be also noted that the variation of the inner diameters of the sintered bodies is large according to the results obtained by repeatedly fabricating the first and second sintered bodies and the like. Namely, the sintered annular body according to the comparative example needs inner side grinding in order to obtain the inner diameter and the inner diameter dimension tolerance in the specifications of the sintered nuclear fuel pellet.

TABLE 2

|  | Inner diameter (mm) | | Outer diameter (mm) | |
| --- | --- | --- | --- | --- |
|  | Average | Tolerance | Average | Tolerance |
| First sintered body | 10.123 | 0.017 | 14.716 | 0.026 |
| Second sintered body | 10.133 | 0.018 | 14.725 | 0.028 |
| First sintered body | 10.143 | 0.016 | 14.748 | 0.027 |

TABLE 2-continued

|  | Inner diameter (mm) | | Outer diameter (mm) | |
| --- | --- | --- | --- | --- |
|  | Average | Tolerance | Average | Tolerance |
| after reduction |  |  |  |  |
| Second sintered body after reduction | 10.159 | 0.016 | 14.763 | 0.024 |

Figure 5:
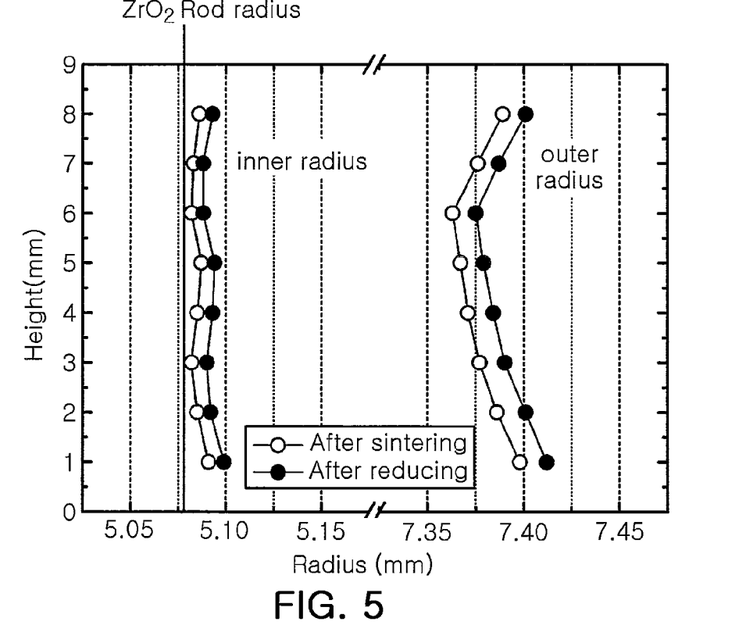
FIG. 5 is a graph showing the results obtained by measuring an inner radius and an outer radius over the direction of a central axis of the sintered annular pellet according to an exemplary embodiment of the present invention.
Figure 6:
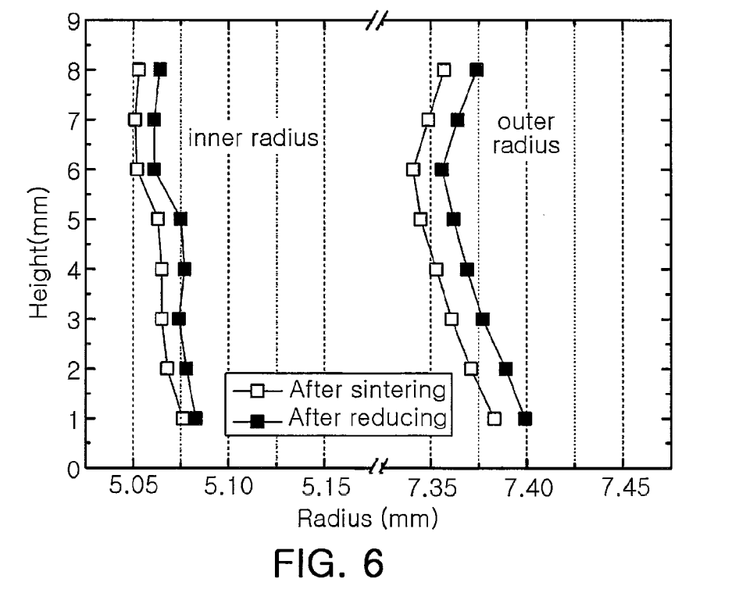
FIG. 6 is a graph showing the results obtained by measuring an inner radius and an outer radius over the direction of a central axis of the sintered annular pellet according to a comparative example of the present invention.

FIGS. 5 and 6 are graphs showing the results obtained by measuring an inner diameter and an outer diameter over the direction of a central axis of the sintered annular pellet according to the embodiment of the present invention and the comparative example.

As shown in FIG. 5, it is noted that, after the annular green body was sintered in the carbon dioxide atmosphere for four hours at the temperature of 1,250 degrees Celsius, and then reduced in the hydrogen atmosphere, the inner diameters of the sintered annular body have all the uniform value along the height of the sintered body, and thus, the inner diameter dimension tolerance is a value of ±13 µm or smaller. After the reducing process, the inner diameter of the sintered annular body was increased due to the volume expansion, and accordingly, the gap between the sintered annular body and the $ZrO_2$ rod illustrated in FIG. 5 further increases to facilitate separation of the sintered annular body from the $ZrO_2$ rod without damaging the sintered annular body.

In comparison, in the case of the sintered annular body obtained by sintering the annular green body, which was fabricated according to the comparative example, in the carbon dioxide atmosphere for four hours at the temperature of 1,250 degrees Celsius and then reducing it in the hydrogen atmosphere, the inner diameter and the outer diameter vary along the height of the sintered body as shown in FIG. 6, having a large dimensional tolerance.

As set forth above, according to exemplary embodiments of the invention, sintered annular nuclear fuel pellets having a uniform inner diameter can be fabricated, and a uniform inner diameter distribution over the height of a single sintered annular nuclear fuel pellet can be maintained. In particular, an inner diameter dimension tolerance can be lowered to below 13 µm without performing a grinding process on the sintered pellet. Thus, the inner and outer gaps of the annular nuclear fuel rod can be more precisely adjusted without any additional processing procedure, and in addition, a method for resolving the problem of an imbalance in the heat flux of the annular nuclear fuel rod can be realized.

Eventually, the stability of the annular nuclear fuel rod can be improved. In addition, in terms of the fabrication cost, the process of grinding the inner surface is not required, so grinding remnants otherwise generated during grinding can be reduced, and the amount of enriched uranium to be recycled can be reduced to contribute to improvement of productivity.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for fabricating a sintered annular nuclear fuel pellet, the method comprising:
   pressing nuclear fuel powder or granule, an oxide of a fissile element (M), to fabricate an annular nuclear fuel green body;
   inserting a rod-like shaped structure into the annular nuclear fuel green body;

sintering the rod-like shaped structure-inserted annular nuclear fuel green body in an atmosphere of a slight oxidizing gas such that the oxide of the fissile element has a balanced O/M ratio higher than a desired O/M ratio (oxygen/fissile element) of a final sintered annular nuclear fuel pellet, while being maintained in a cubic phase;

reducing the sintered annular nuclear fuel pellet in a reductive gas atmosphere so as to have the desired O/M ratio in the state that the rod-like shaped structure is inserted, whereby a gap is formed between the rod-like shaped structure and the sintered annular nuclear fuel pellet; and separating the rod-like shaped structure from the reduced sintered annular nuclear fuel pellet.

2. The method of claim 1, wherein the oxide of the fissile element is uranium oxide, the desired O/M ratio and the balanced O/M ratio are a desired O/U (oxygen/uranium) ratio and a balanced O/U, respectively.

3. The method of claim 2, wherein the desired O/U ratio of the sintered annular nuclear fuel pellet ranges from 2.00 to 2.02.

4. The method of claim 3, wherein the balanced 0/U ratio of the nuclear fuel green body sintered in the slight oxidizing gas atmosphere ranges from 2.1 to 2.25.

5. The method of claim 1, wherein the rod-like shaped structure is made of a metal material.

6. The method of claim 5, wherein the rod-like shaped structure is made of an INCONEL®-based alloy.

7. The method of claim 1, wherein the rod-like shaped structure is made of a ceramic material.

8. The method of claim 7, wherein the rod-like shaped structure comprises at least one ceramic material selected from the group consisting of $ZrO_2$, $ThO_2$, MgO, $Al_2O_3$, SiC, $Si_3N_4$, and graphite.

9. The method of claim 1, wherein a diameter of the rod-like shaped structure is less than the inner diameter of the annular nuclear fuel green body and the diameter of the rod-like shaped structure is the same as or larger than the largest inner diameter of an equivalent sintered annular nuclear fuel pellet if sintered under the same conditions as the sintered annular nuclear fuel pellet of claim 1 except in a state that the rod-like shaped structure is not inserted.

10. The method of claim 1, wherein the slight oxidizing gas is at least one selected from the group consisting of carbon dioxide, water vapor, and inert gas.

11. The method of claim 1, wherein the reductive gas is a hydrogen gas.

12. The method of claim 1, wherein the sintering of the annular nuclear fuel green body is performed at a temperature ranging from 1,000 degrees Celsius to 1,500 degrees Celsius.

13. The method of claim 1, wherein the reducing of the sintered annular nuclear fuel pellet is performed at a temperature ranging from 500 degrees Celsius to 1,500 degrees Celsius.

14. The method of claim 1, wherein the nuclear fuel powder or granule is an oxide of at least one fissile element selected from the group consisting of uranium, plutonium, and thorium.

\* \* \* \* \*

UNITED STATES PATENT AND TRADEMARK OFFICE
CERTIFICATE OF CORRECTION

PATENT NO.       : 8,585,939 B2
APPLICATION NO.  : 12/871146
DATED            : November 19, 2013
INVENTOR(S)      : Young-Woo Rhee et al.

It is certified that error appears in the above-identified patent and that said Letters Patent is hereby corrected as shown below:

On the Title Page, Column 1, Item (75) Inventors, Line 7, after "Ki-Won Kang" insert -- (Deceased) --

Title Page 2, Column 2, Line 7, "Meetying, Gyeongiu" should be -- Meeting, Gyeongju --

Signed and Sealed this
Fifteenth Day of April, 2014

Michelle K. Lee
*Deputy Director of the United States Patent and Trademark Office*